US008813343B2

(12) United States Patent
Smith (10) Patent No.: US 8,813,343 B2
(45) Date of Patent: Aug. 26, 2014

(54) OXYGEN CYLINDER SUPPORT FOR USE IN AIRCRAFT

(76) Inventor: Sydney Noel Smith, Portage la Prairie (CA)

( * ) Notice: Subject to any disclaimer, the term of this patent is extended or adjusted under 35 U.S.C. 154(b) by 745 days.

(21) Appl. No.: 13/037,517

(22) Filed: Mar. 1, 2011

(65) Prior Publication Data

US 2011/0214276 A1    Sep. 8, 2011

Related U.S. Application Data

(60) Provisional application No. 61/311,553, filed on Mar. 8, 2010.

(51) Int. Cl.
*B23P 11/00* (2006.01)
*B23P 17/00* (2006.01)
*B23P 17/04* (2006.01)

(52) U.S. Cl.
CPC ........................................ *B23P 17/04* (2013.01)
USPC .......................... 29/525.03; 206/446; 224/407

(58) Field of Classification Search
USPC .................... 29/525.01, 525.03, 525.04, 428; 244/118.1, 118.2, 118.5, 118.6, 129.1, 244/129.2, 131, 137.1, 122 R; 206/446, 570, 206/225, 226, 231; 139/387 R, 389; 190/100, 102, 119, 103, 104, 105; 150/154; 224/572, 400, 401, 407, 446, 224/485, 501, 159, 158, 160; 5/600–629
See application file for complete search history.

(56) References Cited

U.S. PATENT DOCUMENTS

| | | | | |
|---|---|---|---|---|
| 1,311,923 A * | 8/1919 | Smith | ............................. | 383/86 |
| 3,135,098 A * | 6/1964 | Root | ............................. | 405/186 |
| 4,339,061 A * | 7/1982 | Dunn | ............................. | 224/407 |
| 5,207,303 A * | 5/1993 | Oswalt et al. | ................. | 190/108 |
| 5,259,372 A * | 11/1993 | Gross et al. | ............... | 128/200.24 |
| 5,283,919 A * | 2/1994 | Grant | ................................. | 5/620 |
| 5,288,001 A * | 2/1994 | Locarno | ........................ | 224/407 |
| 6,003,744 A * | 12/1999 | Culjak | ........................ | 224/148.5 |
| 6,279,799 B1 * | 8/2001 | Horton | .......................... | 224/275 |
| 6,672,321 B2 * | 1/2004 | Hamilton | ........................ | 135/67 |
| 6,832,741 B2 * | 12/2004 | Jarosz | ........................ | 244/122 R |
| 7,316,435 B2 * | 1/2008 | Leighton | ........................ | 294/152 |
| 7,520,549 B2 * | 4/2009 | Leighton | ........................ | 294/152 |
| 7,753,589 B2 * | 7/2010 | Palt | ................................. | 383/66 |
| 2001/0037923 A1 * | 11/2001 | Godshaw | ........................ | 190/110 |
| 2002/0174486 A1 * | 11/2002 | Heuvel et al. | ..................... | 5/611 |
| 2003/0006260 A1 * | 1/2003 | Bassett | ........................ | 224/275 |
| 2003/0127121 A1 * | 7/2003 | Hamilton | ........................ | 135/67 |
| 2003/0160076 A1 * | 8/2003 | Lofaro | ........................ | 224/275 |

(Continued)

*Primary Examiner* — David Bryant
*Assistant Examiner* — Christopher M Koehler
(74) *Attorney, Agent, or Firm* — Ryan W. Dupuis; Kyle R. Satterthwaite; Ade & Company Inc.

(57) ABSTRACT

An oxygen storage cylinder is stored in an interior cabin of an aircraft by providing a generally cylindrical envelope of flexible material receiving the cylinder therein and securing the envelope to a fixed seat frame. Circumferential straps are secured to a cylindrical wall portion of the envelope at spaced apart positions along the length thereof for securing the envelope and cylinder therein to an elongate frame member of the seat frame. End straps secured to intersecting frame members prevent longitudinal sliding of the envelope and cylinder therein relative to the elongate frame member of the fixed seat frame. The envelope protects the cylinder from direct contact with the frame to prevent friction or vibration damage to the cylinder while fixing the position of the cylinder in the interior cabin for the safety of surrounding passengers in the event of turbulence.

18 Claims, 5 Drawing Sheets

(56) References Cited

U.S. PATENT DOCUMENTS

| | | | |
|---|---|---|---|
| 2004/0020793 A1* | 2/2004 | Peterolff et al. | 206/0.6 |
| 2004/0129305 A1* | 7/2004 | Hamilton et al. | 135/67 |
| 2006/0060624 A1* | 3/2006 | Duncan et al. | 224/602 |
| 2006/0086356 A1* | 4/2006 | Nahavandi | 128/200.24 |
| 2008/0050051 A1* | 2/2008 | Palt | 383/41 |
| 2008/0073355 A1* | 3/2008 | Akbar | 220/562 |
| 2008/0078911 A1* | 4/2008 | Ziaylek | 248/313 |
| 2008/0173684 A1* | 7/2008 | Kyasky | 224/403 |
| 2008/0190947 A1* | 8/2008 | Bourgraf | 220/737 |
| 2008/0250559 A1* | 10/2008 | Janboecke et al. | 5/2.1 |
| 2009/0020575 A1* | 1/2009 | Katchen et al. | 224/407 |
| 2009/0148240 A1* | 6/2009 | Carmichael | 405/186 |
| 2011/0121046 A1* | 5/2011 | Dexter | 224/581 |

\* cited by examiner

OXYGEN CYLINDER SUPPORT FOR USE IN AIRCRAFT

This application claims the benefit under 35 U.S.C. 119(e) of U.S. provisional application Ser. No. 61/311,553, filed Mar. 8, 2010.

FIELD OF THE INVENTION

The present invention relates to a method of supporting an oxygen storage cylinder of the type commonly used for medical related breathing assistance, and more particularly the present invention relates to a support device arranged to secure the oxygen storage cylinder in an interior cabin of an aircraft.

BACKGROUND

Persons with various medical conditions are carry an oxygen storage cylinder with them for breathing assistance as needed. Various types of carriers for transporting a cylinder with a user are available. When boarding an airplane however, conventional carriers are not capable of adequately securing the cylinder in a safe manner which is protected from turbulence. Other alternatives include the user carrying the cylinder manually, however this is also unsafe and unprotected from turbulence. Some devices are intended to rigidly contain the cylinder, however, known attempts for supporting an oxygen cylinder in an aircraft involve rigid components which potentially wear against one another when exposed to the repeated vibrations in an aircraft so as to be also unsafe.

SUMMARY OF THE INVENTION

According to one aspect of the invention there is provided a method of supporting an oxygen storage cylinder in an interior cabin of an aircraft, the method comprising:

providing an envelope of flexible material comprising a generally cylindrical wall portion extending in a longitudinal direction between opposing first and second ends and an end wall spanning the first end of the cylindrical wall portion, the second end of the cylindrical wall portion including an opening therein;

inserting the oxygen storage cylinder into the envelope of flexible material through the opening in the second end of the cylindrical wall portion such that the cylindrical wall portion surrounds the oxygen storage cylinder;

providing a plurality of circumferential straps secured to the cylindrical wall portion at spaced apart positions in the longitudinal direction of the envelope;

positioning the envelope adjacent a frame assembly in the interior cabin of the aircraft which is fixed in relation to the aircraft; and securing each circumferential strap to extend fully about a circumference of the cylinder in the envelope and about respective frame members of the frame assembly adjacent to the envelope.

By providing an envelope of flexible material which fully surrounds an oxygen storage cylinder and which couples straps circumferentially thereabout, an oxygen storage cylinder can be well secured in relation to a fixed frame of the aircraft while also protecting the cylinder from damage or wear in the environment of an aircraft.

Preferably a first end strap is coupled to the first end of the envelope and the first end strap is secured about a respective frame member of the frame assembly.

Preferably a fixed end of the first end strap is anchored to the first end of the envelope and an opposing free end of the first end strap is secured to the cylindrical wall portion. In this instance, the free end of the first end strap may be overlapped with one of the circumferential straps.

A second end strap may be coupled to the second end of the envelope in which the second end strap is supported to extend diametrically across the opening in the second end of the envelope so as to retain the cylinder in the envelope.

The oxygen storage cylinder is preferably supported in the envelope such that a regulator valve supported on cylinder projects through the opening and the second end strap is secured across the opening such that the second end strap is wrapped at least partway about the regulator valve so as to retain the cylinder in the envelope.

Preferably two second end straps are coupled to the second end of the envelope such that each second end strap is supported to extend diametrically across the opening transversely to one another so as to retain the cylinder in the envelope.

When the oxygen storage cylinder is supported in the envelope such that a regulator valve supported on cylinder projects through the opening, preferably the second end straps are secured across the opening such that the second end straps are wrapped partway about opposing sides of the regulator valve and intersect one another so as to retain the cylinder in the envelope.

The free ends of the second end straps are also preferably overlapped by one of the circumferential straps so as to retain the cylinder in the envelope.

Preferably the flexible material of the envelope is positioned between the cylinder and each corresponding portion of the frame assembly such that the cylinder and frame assembly do not contact one another.

Two of the circumferential straps are preferably located adjacent respective ones of the opposing ends of the envelope and an additional intermediate one of the circumferential straps may be located about the envelope at a central location in the longitudinal direction.

When receiving a cylinder in the envelope which is shorter than the envelope, the method preferably includes: i) positioning a regulator valve of the cylinder to project through the opening of the envelope, and ii) securing the cylindrical wall portion to span a bottom end of the cylinder opposite the regulator valve at an intermediate location in the longitudinal direction of the envelope. In additional, diametrically opposed portions of the cylindrical wall portion are preferably joined to one another across the bottom end of the cylinder.

When providing the envelope in combination with first and second cylinders in which the second cylinder is shorter than the first cylinder, the method preferably includes:

receiving the first cylinder in the envelope such that the end wall spans a bottom end of the cylinder when a regulator valve of the first cylinder projects through the opening; and alternately receiving the second cylinder in the envelope in place of the first cylinder by positioning a regulator valve of the second cylinder to project through the opening of the envelope and securing the cylindrical wall portion to span a bottom end of the second cylinder opposite the regulator valve at an intermediate location in the longitudinal direction of the envelope.

When the frame assembly of the aircraft comprises a seat frame supporting at least one passenger seat thereon, the method may include securing the circumferential straps about respective frame members of the seat frame.

When the seat frame further comprises a pair of spaced apart upright leg members and a crossbar extending between the upright leg members, the method may include securing the circumferential straps about the crossbar of the seat frame.

When there is provided a first end strap coupled to the first end of the envelope, the first end strap is preferably secured about a frame member oriented transversely to the crossbar.

When the frame assembly of the aircraft comprises a fixed seat frame supporting at least one passenger seat thereon, the method may further include:

securing the circumferential straps about a generally horizontal frame member of the seat frame;

providing a first end strap coupled to the first end of the envelope, and securing the first end strap about an upright frame member of the seat frame which is oriented transversely to the generally horizontal frame member.

A pocket formed of transparent material may also be supported on an exterior of the cylindrical wall portion for supporting technical data relating to the cylinder in the pocket.

One embodiment of the invention will now be described in conjunction with the accompanying drawings in which.

BRIEF DESCRIPTION OF THE DRAWINGS

In the drawings like characters of reference indicate corresponding parts in the different figures.

DETAILED DESCRIPTION

Referring to the accompanying figures there is illustrated an oxygen storage cylinder support device generally indicated by reference numeral 10. The device 10 is well suited for securing an oxygen storage cylinder 12 in fixed relation to the interior cabin of an aircraft.

In a typical aircraft a plurality of seat frame assemblies 14 are provided which each support a pair of occupant seats 16 thereon. In the illustrated embodiment, the seat frame assembly 14 comprises two leg frames 18 at laterally spaced apart ends of the frame assembly in which each leg frame 18 comprises a pair of leg members spaced apart at respective front and rear corners of the frame assembly. A crossbar 20 is shown spanning generally horizontally between the two front leg members. Diagonal braces 22 are also shown spanning diagonally between each front leg member and the corresponding rear leg member of each leg frame 18. The crossbar 20 and the leg members at opposing ends thereof are accordingly oriented transversely to one another.

Figure 6:
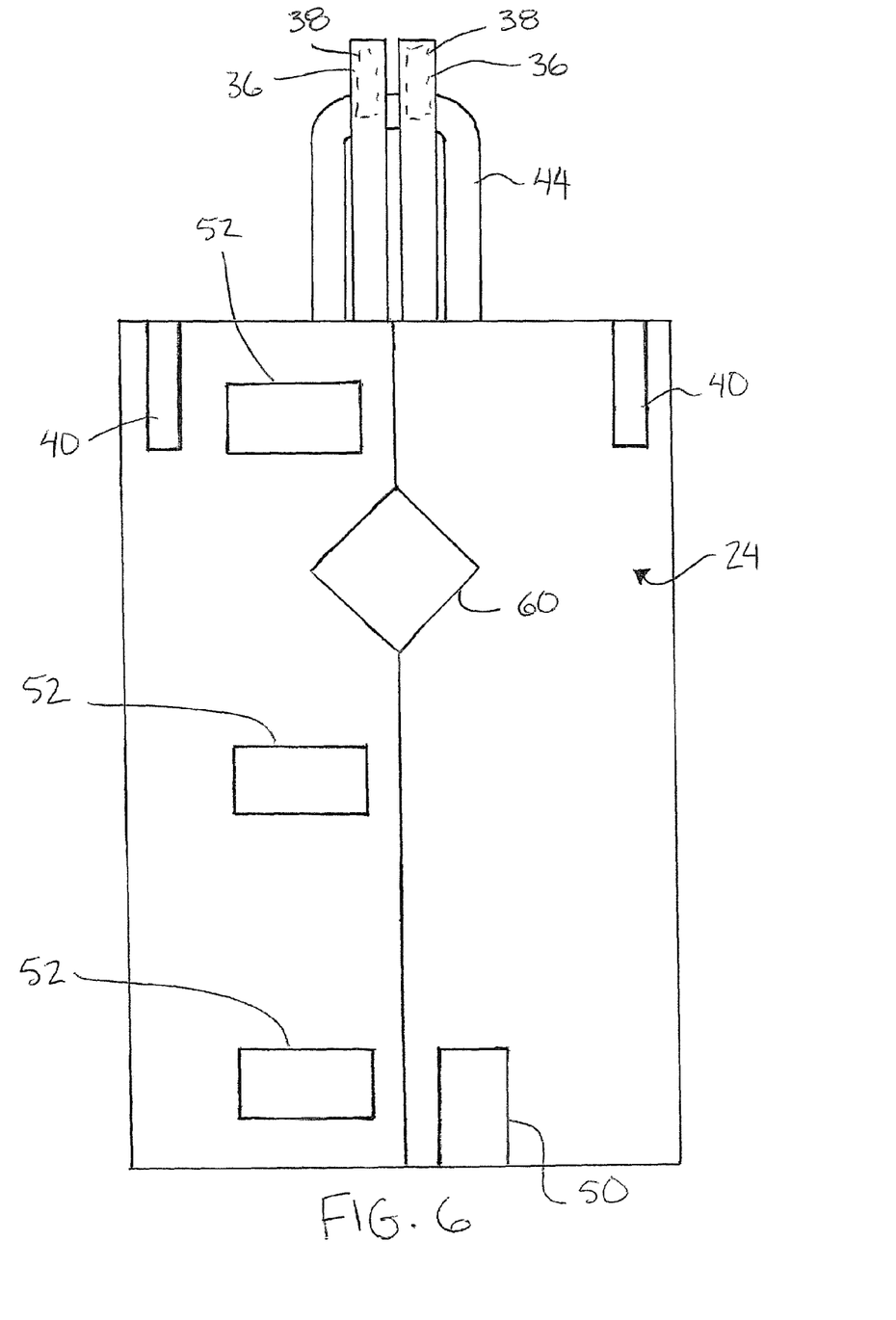
FIG. 6 is a plan view of the outer side of the cylindrical wall portion of the envelope when laid flat prior to assembly into a cylindrical structure.
Figure 7:
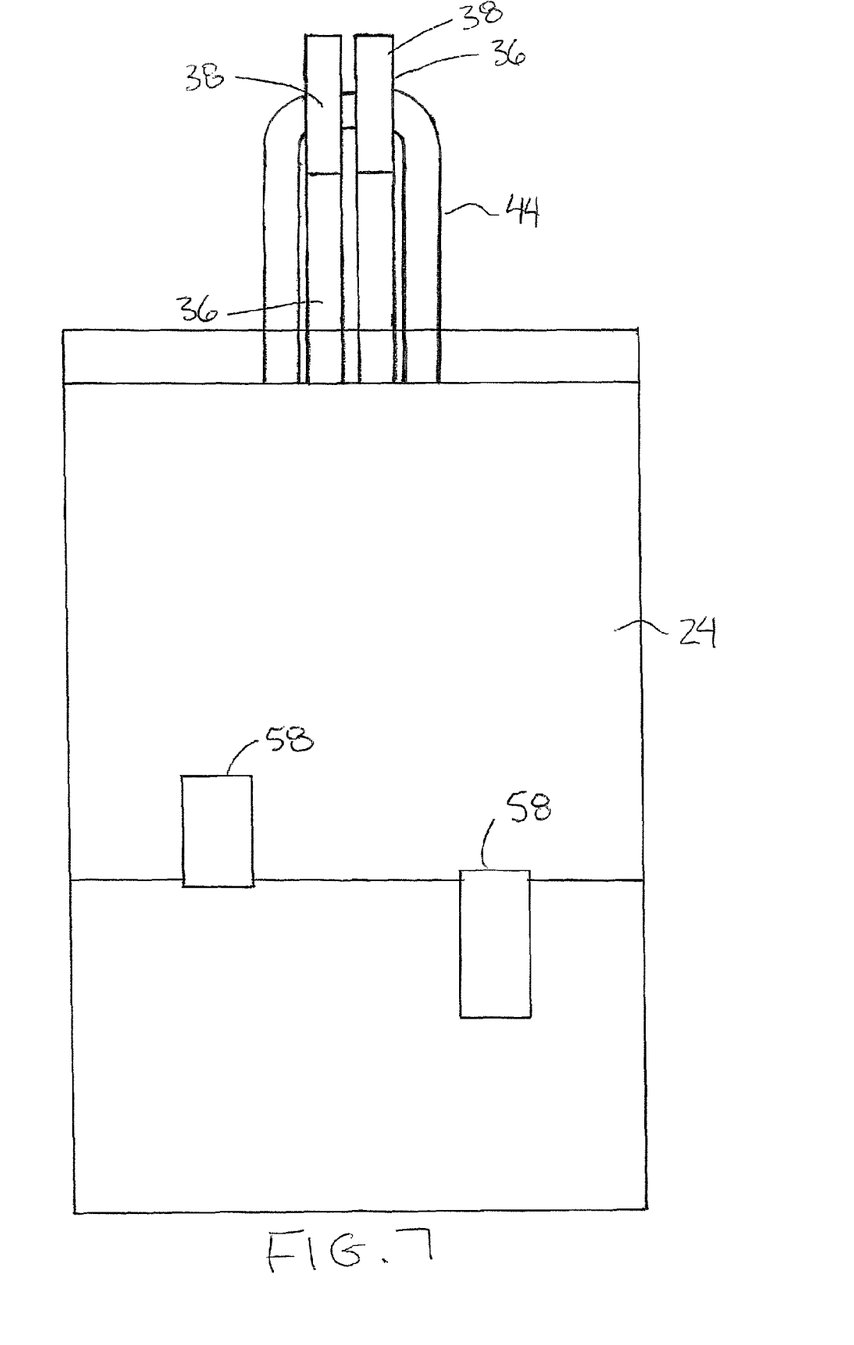
FIG. 7 is a plan view of the inner side of the cylindrical wall portion according to FIG. 6.

The device 10 generally comprises an envelope 24 suitable for receiving the cylinder therein. The envelope comprises a cylindrical wall portion 26 formed of a flat rectangular sheet of material as shown in FIGS. 6 and 7 with long sides sewn together to form the generally cylindrical structure which fully surrounds the cylindrical wall of the cylinder 12. The cylindrical wall portion 26 is elongate in a longitudinal direction between a first end 28 and an opposing second end 30.

A circular end wall 32, also formed of flexible material, fully spans the first end 28 of the cylindrical wall portion to fully enclose the first end of the envelope.

An opening 34 is provided at the second end 30 which fully spans the end of the envelope so as to be identical in diameter to the cylindrical wall portion. The cylindrical wall portion is suitably sized to slidably receive the cylinder 12 through the opening 34 with the wall portion being closely fit about the cylinder 12 such that the cylinder is fully surrounded and protected by the flexible and somewhat resilient material forming the envelope. When the cylinder is received within the envelope and the envelope is supported in fixed relation to the seat frame assembly, the envelope forms a full barrier between the cylinder 12 and the frame assembly such that there is no contact therebetween.

At the second end 30 of the envelope there is provided two second end straps 36 mounted to the peripheral edge about the opening 34. Each of the two end straps 36 are fixedly mounted at a fixed end to the interior surface of the cylindrical wall portion at circumferentially spaced positions at the same side as the wall portion in close proximity to one another. The second end straps 36 have a suitable length to extend diametrically across the opening 34 in use. The free ends of the two second end straps 36 include respective mating fasteners 38 thereon which are arranged to be joined to respective ones of the mating fasteners 40 provided at spaced positions on the outer surface of the wall portion at the second end 30 thereof diametrically opposite from the fixed ends of the end straps. The free ends of the two second end straps 36 are thus arranged to be fastened adjacent one another by a mating connection between the mating fasteners 38 and the mating fasteners 40. In a preferred embodiment the mating fasteners comprise mating hook and loop fasteners with hooks being provided on one of the mating fasteners and loops being provided on the other one.

In a typical mounting configuration, the envelope is matched in size to a specific cylinder such that when the bottom of the cylinder abuts the end wall of the envelope the cylinder spans the full length of the envelope such that a regulator valve 42 of the cylinder projects through the opening 34. In this instance, the two end straps are first crossed over with one another and then wrapped around opposing sides of the stem of the regulator valve 42 to permit again crossing over each other at a diametrically opposed side of the stem prior to fastening the free ends to the wall portion using the mating fasteners 38 and 40. The two second end straps 36 each extend partway about the circumference of the stem of the regulator valve such that the two end straps together substantially fully surround the stem of the valve and are intertwined transversely to one another to effectively retain the cylinder within the envelope.

A handle strap 44 is also provided at the second end of the envelope which is generally U-shaped in construction in the form of a flexible strap anchored at opposing ends at circumferentially spaced positions about the peripheral edge of the opening on the inner surface of the cylindrical wall portion.

A first end strap 46 is provided at the first end of the envelope and includes a fixed end which is fixedly secured to the end wall at a central location thereon, for example by stitching and the like. An opposing free end of the first end strap includes a suitable mating fastener 48 thereon which can be selectively secured to a corresponding mating fastener 50 on the outer surface of the cylindrical wall portion adjacent the first end of the envelope. The mating fastener 48 on the free end of the first end strap 46 spans a considerable length of the first end strap and is much longer than the corresponding fastener 50 on the envelope such that the free end of the first end strap can be secured to the envelope at various adjustable positions in relation thereto which effectively adjusts the overall length of the first end strap 46 between the fastened ends thereof to accommodate wrapping about various different dimensions of frame members when securing the envelope to the frame assembly.

The device 10 further comprises three circumferential straps 52 mounted onto the outer surface of the cylindrical wall portion at longitudinally spaced positions therealong. In particular, two of the circumferential straps 52 are secured adjacent opposing first and second ends of the envelope, while an intermediate one of the straps 52 is secured to the wall portion at a central location between the two ends. Each of the circumferential straps 52 comprises a fixed end which is anchored onto the exterior of the cylindrical wall portion in fixed relation thereto, for example by stitching and the like. Each of the straps 52 has a sufficient length to be wrapped about the full circumference of the envelope more than once when a cylinder is received within the envelope.

Similarly to the previous straps, a mating fastener 52 is provided along an interior length of the circumferential straps adjacent the free end thereof. A corresponding mating fastener 56 is provided along an exterior length of the circumferential strap 52 such that when each circumferential strap is wrapped about a full circumference of the envelope or is wrapped about various dimensions of frame members together with the envelope, the mating fastener at the free end of each strap on the inner surface thereof is arranged to be aligned with the corresponding mating fastener on the exterior on the same strap while permitting the length between the fastened ends of the straps to be adjusted as may be desired.

At each of the opposed ends of the envelope, the circumferential straps 52 are arranged in longitudinal alignment with the corresponding mating fasteners to which the first and second ends straps are arranged to be secured such that once the end straps are secured by using their corresponding mating fasteners, the circumferential straps overlap the end straps and assist in further retaining the end straps in a secured configuration.

Figure 1:
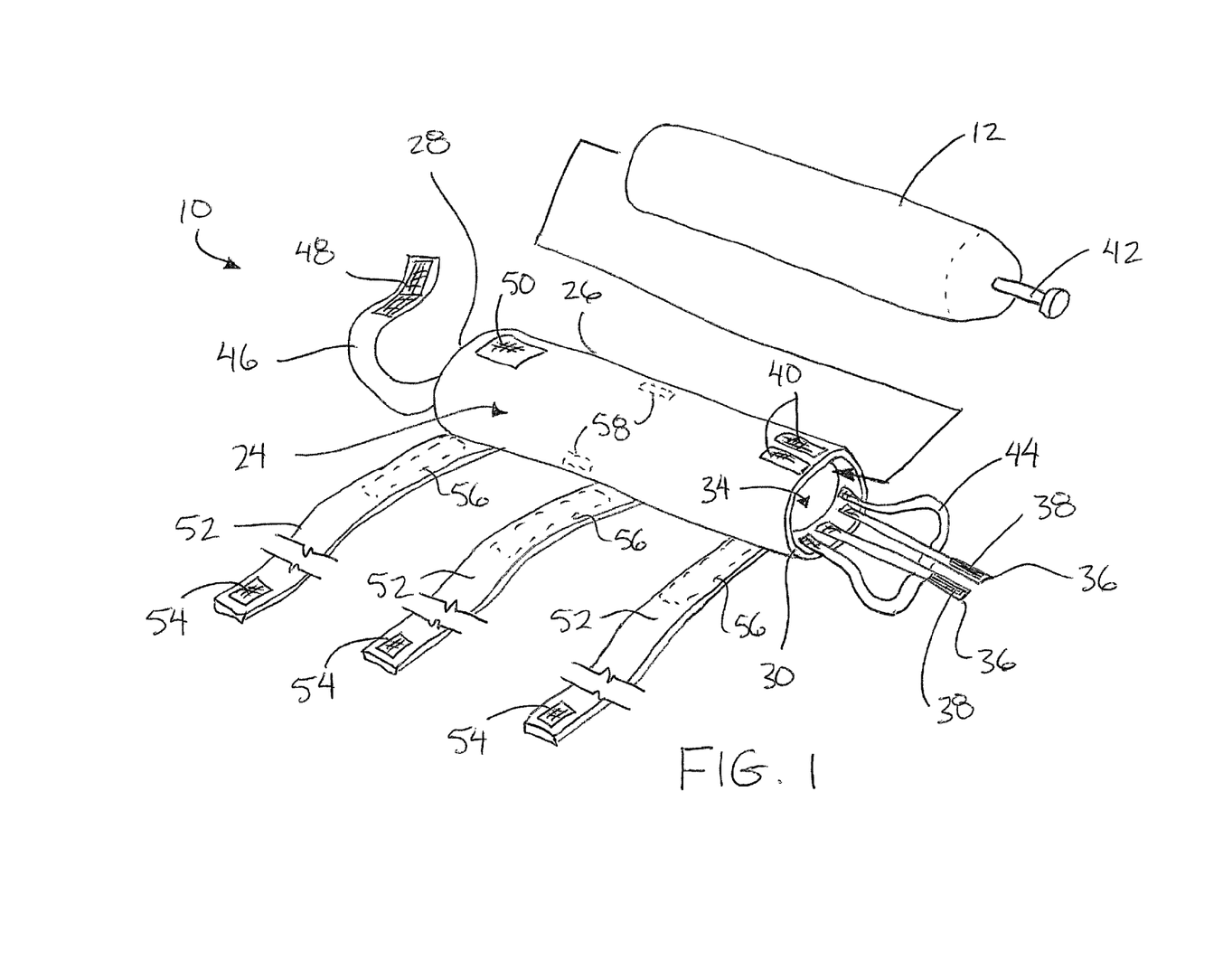
FIG. 1 is an exploded perspective view of the support device together with an oxygen storage cylinder.
Figure 2:
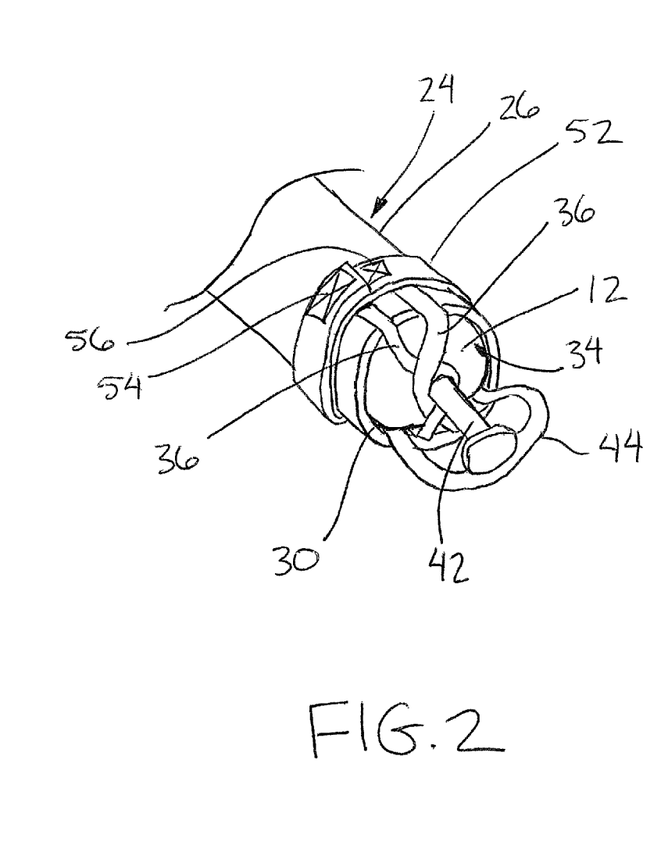
FIG. 2 is a perspective view of an open end of the envelope.
Figure 3:
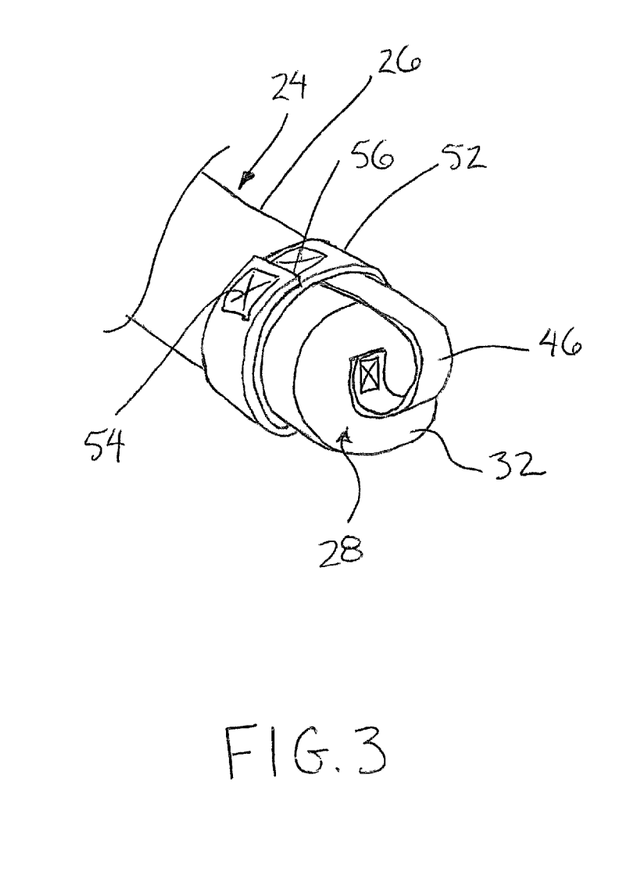
FIG. 3 is a perspective view of the end wall opposite the open end of the envelope.

In the illustrated embodiment the envelope is shown to correspond to the length of a first cylinder 12. Typically, the cylinders are available in a second length which is shorter than the first length shown. When mounting a second cylinder which is shorter than the first cylinder shown in FIG. 1, the bottom end of the cylinder opposite the regulator valve is typically located approximately at an intermediate location near the intermediate circumferential strap when the regulator valve is similarly positioned to project through the opening at a second end of the envelope. To snugly secure the cylinder in the longitudinal direction relative to the envelope, two opposing sides of the cylindrical wall portion are joined together at the inner surface thereof such that the cylindrical wall portion spans across the bottom of the second cylinder which is shorter than the first cylinder shown in the drawings. A joining of the opposing sides is formed by a pair of mating fasteners 58 which are secured to the inner surface of the cylindrical wall portion as shown in FIG. 1. The mating fasteners 58 are slightly misaligned in the longitudinal direction so as to permit the fastener on one side to be folded towards the fastener on the other side as the cylindrical wall portion spans across the bottom side of the shorter second cylinder. As described above with regard to previous mating fasteners, in the illustrated embodiment the mating fasteners 58 also comprise hook and loop fasteners arranged to be selectively mated with one another.

A transparent pocket 60 is provided on the exterior surface of the cylindrical wall portion to receive various information therein which can be visibly displayed through the transparent pocket. Typical information includes technical or safety data relating to the oxygen storage cylinder.

Figure 4:
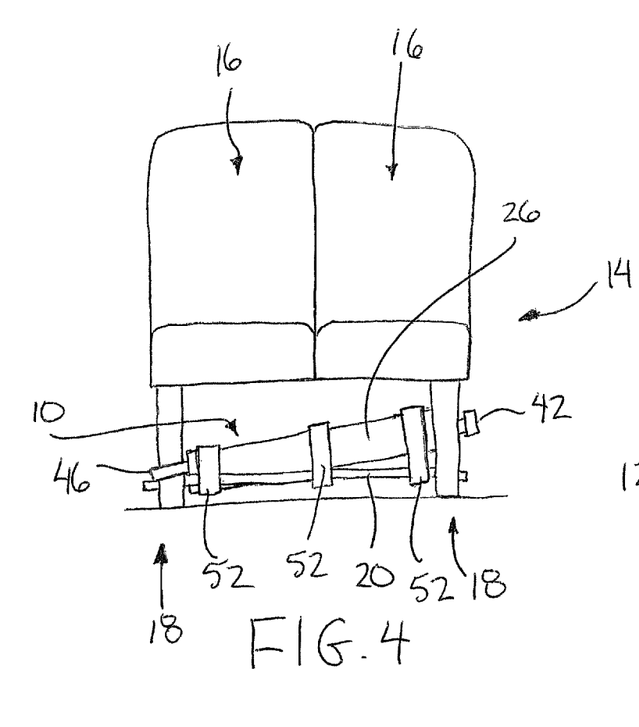
FIG. 4 is a front elevational view of the device supporting a cylinder in fixed relation to a seat frame of an aircraft.
Figure 5:
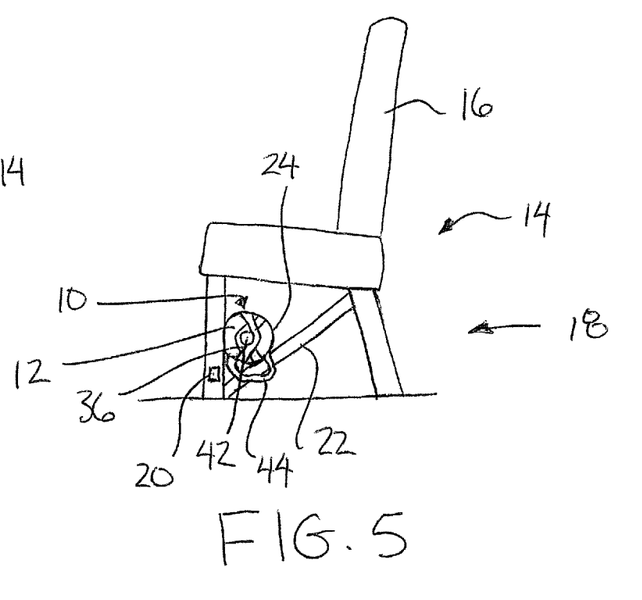
FIG. 5 is an end elevational view of the device supporting a cylinder on the seat frame of FIG. 4.

In a preferred arrangement as shown in FIGS. 4 and 5, a cylinder is received within the envelope such that the envelope spans across the bottom side of the cylinder in direct contact therewith while the cylindrical wall portion spans the full length of the cylinder 12 such that the regulator valve of the cylinder projects through the opening at the second end of the envelope. The second end straps are crossed over one another and each wrapped partway about the stem of the regulator valve to fully surround the valve as the two second end straps span diametrically across the opening at the second end of the envelope and retain the cylinder in the envelope. The envelope is then positioned adjacent a frame assembly in the interior cabin in the aircraft which is fixed in relation to the aircraft such that wrapping each of the circumferential straps about the full circumference of the cylinder and respective ones of the frame members of the frame assembly serves to both retain the end straps in a secure mounted configuration as well as fixing the envelope and cylinder received therein in relation to the frame assembly. The first end strap 46 is typically wrapped about a frame member of the frame assembly, which is transverse to the frame members that the circumferential straps are wrapped about, prior to wrapping of the circumferential straps such that the circumferential strap at the first end of the envelope can overlap the first end strap as described above.

In the illustrated embodiment of a seat frame, the cylinder is positioned to span generally in the lateral direction of the seat frame assembly to span between the leg frames at opposing ends of the assembly. As shown, the second end of the envelope is nested between one of the upright leg members and a diagonal cross brace with the circumferential strap being strapped to a horizontal crossbar of the seat frame to retain the second end snugly nested within the leg frame. As shown in FIG. 4, the first end strap at the opposing first end is wrapped about the opposing leg frame member which is abutted with the first end of the envelope and cylinder received therein to prevent displacement of the envelope in the lateral direction. The remaining circumferential straps are also wrapped about the horizontal crossbar which extends in the lateral direction. The circumferential straps effectively retain the position of the envelope alongside the horizontal crossbar while the first end strap is secured to an upright member transverse to the horizontal cross bar to prevent sliding displacement of the envelope along the crossbar in the lateral direction of the crossbar.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A method of supporting an oxygen storage cylinder in an interior cabin of an aircraft, the method comprising:
  providing an envelope of flexible material comprising a generally cylindrical wall portion extending in a longitudinal direction between opposing first and second ends and an end wall spanning the first end of the cylindrical wall portion, the second end of the cylindrical wall portion including an opening therein;

inserting the oxygen storage cylinder into the envelope of flexible material through the opening in the second end of the cylindrical wall portion such that the cylindrical wall portion surrounds the oxygen storage cylinder;

providing a plurality of circumferential straps secured to the cylindrical wall portion at spaced apart positions in the longitudinal direction of the envelope;

providing a first end strap coupled to the first end of the envelope;

positioning the envelope adjacent a frame assembly in the interior cabin of the aircraft which is fixed in relation to the aircraft and which includes a first frame member and a second frame member oriented transversely to the first frame member such that the envelope extends in the longitudinal direction alongside the first frame member and is abutted at the first end against the second frame member; and securing each circumferential strap to extend fully about a circumference of the cylinder in the envelope and about the first frame member of the of the frame assembly adjacent to the envelope; and securing the first end strap about the second frame member abutted at the first end of the envelope.

2. The method according to claim 1 including providing a fixed end of the first end strap being anchored to the first end of the envelope and securing the first end strap about the first frame member of the frame assembly by securing an opposing free end of the first end strap to the cylindrical wall portion adjacent the first end of the envelope.

3. The method according to claim 1 including anchoring a fixed end of the first end strap to the first end of the envelope, securing an opposing free end of the first end strap to the cylindrical wall portion using hook and loop fasteners, and overlapping the free end of the first end strap which is secured to the cylindrical wall portion using hook and loop fasteners with one of the circumferential straps.

4. The method according to claim 1 including providing a second end strap coupled to the second end of the envelope and securing the second end strap to extend diametrically across the opening in the second end of the envelope so as to retain the cylinder in the envelope.

5. The method according to claim 4 including supporting the oxygen storage cylinder in the envelope such that a regulator valve supported on cylinder projects through the opening, and securing the second end strap across the opening such that the second end strap is wrapped at least partway about the regulator valve so as to retain the cylinder in the envelope.

6. The method according to claim 1 including providing two second end straps coupled to the second end of the envelope and securing each second end strap to extend diametrically across the opening transversely to one another so as to retain the cylinder in the envelope.

7. The method according to claim 1 including positioning the flexible material of the envelope between the cylinder and the frame assembly such that the cylinder and frame assembly do not contact one another.

8. The method according to claim 1 including locating two of the circumferential straps adjacent respective ones of the opposing ends of the envelope and locating an intermediate one of the circumferential straps about the envelope at a central location in the longitudinal direction.

9. The method according to claim 1 including receiving a cylinder in the envelope which is shorter than the envelope, positioning a regulator valve of the cylinder to project through the opening of the envelope, and securing the cylindrical wall portion to span a bottom end of the cylinder opposite the regulator valve at an intermediate location in the longitudinal direction of the envelope.

10. The method according to claim 9 including joining diametrically opposed portions of the cylindrical wall portion to one another across the bottom end of the cylinder.

11. The method according to claim 1 wherein the oxygen storage cylinder comprises a first cylinder and wherein the method further comprises:

providing a second cylinder which is shorter than the first cylinder;

receiving the first cylinder in the envelope such that the end wall spans a bottom end of the cylinder when a regulator valve of the first cylinder projects through the opening; and alternately receiving the second cylinder in the envelope in place of the first cylinder by positioning a regulator valve of the second cylinder to project through the opening of the envelope and securing the cylindrical wall portion to span a bottom end of the second cylinder opposite the regulator valve at an intermediate location in the longitudinal direction of the envelope.

12. The method according to claim 1 wherein the frame assembly of the aircraft comprises a seat frame supporting at least one passenger seat thereon, and wherein the method further comprises securing the circumferential straps about respective frame members of the seat frame.

13. The method according to claim 12 wherein the seat frame comprises a pair of spaced apart upright leg members and a crossbar extending between the upright leg members, the method including securing the circumferential straps about the crossbar of the seat frame.

14. The method according to claim 1 wherein the frame assembly of the aircraft comprises a seat frame supporting at least one passenger seat thereon, and wherein the method further comprises:

securing the circumferential straps about a generally horizontal frame member of the seat frame; and securing the first end strap about an upright frame member of the seat frame which is oriented transversely to the generally horizontal frame member.

15. The method according to claim 1 including supporting a pocket formed of transparent material on an exterior of the cylindrical wall portion and supporting technical data relating to the cylinder in the pocket.

16. A method of supporting an oxygen storage cylinder having a regulator valve in an interior cabin of an aircraft, the method comprising:

providing an envelope of flexible material comprising a generally cylindrical wall portion extending in a longitudinal direction between opposing first and second ends and an end wall spanning the first end of the cylindrical wall portion, the second end of the cylindrical wall portion including an opening therein;

providing a plurality of circumferential straps secured to the cylindrical wall portion at spaced apart positions in the longitudinal direction of the envelope;

providing two second end straps, each second end strap extending between a fixed end coupled to the envelope in proximity to the second end of the envelope and an opposing free end;

inserting the oxygen storage cylinder into the envelope of flexible material through the opening in the second end of the cylindrical wall portion such that the cylindrical wall portion surrounds the oxygen storage cylinder and such that the regulator valve supported on cylinder projects through the opening;

securing the free ends of the second end straps to the envelope such that the second end straps extend across the opening, the second end straps are wrapped partway about opposing sides of the regulator valve and the second end straps intersect one another so as to retain the cylinder in the envelope;

positioning the envelope adjacent a frame assembly in the interior cabin of the aircraft which is fixed in relation to the aircraft; and securing each circumferential strap to extend fully about a circumference of the cylinder in the envelope and about respective frame members of the frame assembly adjacent to the envelope.

17. The method according to claim 16 including securing the free ends of the second end straps to the cylindrical wall portion in proximity to the second end of the envelope using hook and loop fasteners and overlapping the free ends of the second end straps by one of the circumferential straps so as to retain the cylinder in the envelope.

18. A method of supporting an oxygen storage cylinder in an interior cabin of an aircraft, the method comprising:

providing an envelope of flexible material comprising a generally cylindrical wall portion extending in a longitudinal direction between opposing first and second ends and an end wall spanning the first end of the cylindrical wall portion, the second end of the cylindrical wall portion including an opening therein;

providing a plurality of circumferential straps secured to the cylindrical wall portion at spaced apart positions in the longitudinal direction of the envelope;

providing a first end strap having a fixed end of the first end strap being anchored to the first end of the envelope;

providing two second end straps, each second end strap extending between a fixed end coupled to the envelope in proximity to the second end of the envelope and an opposing free end;

inserting the oxygen storage cylinder into the envelope of flexible material through the opening in the second end of the cylindrical wall portion such that the cylindrical wall portion surrounds the oxygen storage cylinder and such that the regulator valve supported on cylinder projects through the opening;

securing the free ends of the second end straps to the cylindrical wall portion of the envelope using hook and loop fasteners such that:
the second end straps extend across the opening;
the second end straps are wrapped partway about opposing sides of the regulator valve; and
the second end straps intersect one another so as to retain the cylinder in the envelope;

positioning the envelope adjacent a frame assembly in the interior cabin of the aircraft which is fixed in relation to the aircraft and which includes a first frame member and a second frame member oriented transversely to the first frame member such that the envelope extends in the longitudinal direction alongside the first frame member and is abutted at the first end against the second frame member;

securing a free end of the first end strap opposite from the fixed end of the first end strap to the cylindrical wall portion using hook and loop fasteners such that the first end strap extends about the second frame member abutted at the first end of the envelope securing each circumferential strap to extend fully about a circumference of the cylinder in the envelope and about the first frame member of the of the frame assembly adjacent to the envelope such that:
one of the circumferential straps overlaps the free end of the first end strap which is secured to the cylindrical wall portion using hook and loop fasteners; and
one of the circumferential straps overlaps the free ends of the second end straps by one of the circumferential straps so as to retain the cylinder in the envelope.

\* \* \* \* \*